(12) United States Patent
Kim et al.

(10) Patent No.: US 8,382,295 B1
(45) Date of Patent: Feb. 26, 2013

(54) OPTICAL ASSEMBLY FOR ELECTRONIC DEVICES

(75) Inventors: John T. Kim, La Canada, CA (US); Joseph J. Hebenstreit, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 176 days.

(21) Appl. No.: 12/827,061

(22) Filed: Jun. 30, 2010

(51) Int. Cl.
*G03B 21/14* (2006.01)

(52) U.S. Cl. .............. 353/119; 353/34; 353/85; 353/98; 353/99; 353/122; 715/764; 348/552

(58) Field of Classification Search .................... 353/30, 353/31, 33, 34, 85, 98, 99, 121, 122; 348/563, 348/552, 564, 567, 588, 584; 715/851, 863, 715/764, 810; 345/106, 108, 212, 213, 214
See application file for complete search history.

(56) References Cited

U.S. PATENT DOCUMENTS

| | | | |
|---|---|---|---|
| 4,680,681 A | 7/1987 | Fisherman et al. | |
| 5,280,416 A | 1/1994 | Hartley et al. | |
| 5,417,575 A | 5/1995 | McTaggart | |
| 5,442,528 A | 8/1995 | Vandenbelt | |
| 5,460,414 A | 10/1995 | Sargis | |
| 6,533,431 B2 | 3/2003 | Leifer et al. | |
| 6,550,922 B2 * | 4/2003 | Bogomolnyi | 353/122 |
| 6,799,861 B2 | 10/2004 | Naghi et al. | |
| 6,805,459 B1 | 10/2004 | Prescott et al. | |
| 6,851,822 B2 * | 2/2005 | Herrera | 362/99 |
| 7,618,065 B2 | 11/2009 | Yau | |
| 7,854,319 B2 | 12/2010 | Yau | |
| 8,047,670 B2 | 11/2011 | Patrick et al. | |
| 8,186,843 B2 | 5/2012 | Mish et al. | |
| 2003/0086256 A1 | 5/2003 | Ip | |
| 2004/0017677 A1 | 1/2004 | Krietzman | |
| 2005/0063697 A1 | 3/2005 | Tsai et al. | |
| 2006/0017887 A1 * | 1/2006 | Jacobson et al. | 353/30 |
| 2008/0049416 A1 | 2/2008 | Fisherman et al. | |
| 2008/0232098 A1 | 9/2008 | Nelson et al. | |
| 2008/0266835 A1 | 10/2008 | Chang | |
| 2010/0103380 A1 | 4/2010 | Destain | |
| 2011/0193788 A1 * | 8/2011 | King et al. | 345/173 |

(Continued)

FOREIGN PATENT DOCUMENTS

WO WO94/12076 6/1994

OTHER PUBLICATIONS

Biba, P. "Review: Periscope Lighted Portfolio for Kindle 2", Jul. 22, 2009, retrieved from the internet Feb. 18, 2011 <<http://www.teleread.com/paul-biba/review-periscope-lighted-portfolio-for-kindle-2>> 5 pages.

(Continued)

*Primary Examiner* — Georgia Y Epps
*Assistant Examiner* — Sultan Chowdhury
(74) *Attorney, Agent, or Firm* — Lee & Hayes, PLLC (57) ABSTRACT

A electronic device that includes an optical assembly containing a projector, an imager, or both is described. The optical assembly may be disposed in an accessory such as a cover for the electronic device, or the electronic device itself. The optical assembly may be attached by a flexible connector or articulated arm that, when extended, positions the optical assembly generally above a plane of an electronic display of the device. The optical assembly may project images onto the electronic display, portions of the cover, or other surfaces. An imager in the optical assembly detects user gestures or other visual inputs to initiate commands on the electronic device.

38 Claims, 10 Drawing Sheets

U.S. PATENT DOCUMENTS

2011/0307842 A1* 12/2011 Chiang et al. ............ 715/863

OTHER PUBLICATIONS

Translated PCT Search Report mailed Mar. 3, 2011 for PCT Application No. PCT/US10/61991, a counterpart foreign application for U.S. Appl. No. 12/683,945.

Lumatec, Everest Mini Instructive Manual, retrieved on Sep. 16, 2009 at <<http://www.lumatec.com/download/manuals/ev110_manual.pdf>>, 1 pg.

Lumatec, Reading Light, retrieved on Sep. 14, 2009 at <<http://www.lumatec.com/reading/ev_150.htm>>, 1 pg.

Lyra Light, Barnes & Noble—retrieved on Oct. 27, 2009 at <http://gifts.barnesandmobile.com/Lyra-Light/e/9781599859439/?cds2Pid=30255>, 4 pages.

Gizmodo, Nook Reading Light, retrieved on Oct. 27, 2009 at <http://gizmodo.com/5381149/bn-reader-gal//galery/3>, 1 page.

Lumatec, Everest Computer Instruction Manual, retrieved on Sep. 16, 2009 at <<http://www.lumatec.com/download/manuals/ev160_manual.pdf>>, 1 pg.

Lumatec, Everest Mini Instruction Manual, retrieved on Sep. 16, 2009 at <<http://www.lumatec.com/download/manuals/ev110_manual.pdf>>, 1 pg.

Lumatec, Reading Light, retrieved on Sep. 14, 2009 at <<http://lumatec.com/reading/ev_150.htm>>, 1 pg.

Lyra Light, Barnes & Noble—retrieved on Oct. 27, 2009 at <http://gifts.barnesandmoble.com/Lyra-Light/e/9781599859439/?cds2Pid=30255>, 4 pages.

Non-Final Office Action for U.S. Appl. No. 12/683,945, mailed on Feb. 17, 2012, Joseph J. Hebenstreit et al., "Book Light for Electronic Book Reader Devices", 8 pages.

* cited by examiner

OPTICAL ASSEMBLY FOR ELECTRONIC DEVICES

BACKGROUND

A large and growing population of users is enjoying entertainment through the consumption of digital media items, such as electronic books on electronic book ("eBook") reader devices. eBook reader devices may employ electrophoretic displays (EPD) or other reflective display technologies to reduce eye strain and to reduce power consumption. However, users may also wish to view video or other images for which the reflective displays are not optimized to render.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed towards an optical assembly for electronic devices, such as a dedicated handheld electronic book ("eBook") reader device or any other type of electronic device. The example eBook reader device is designed to allow users to read or otherwise consume electronic content (e.g., text, graphics, multimedia, and the like), such as that found in eBooks, magazines, RSS feeds, newspapers, and the like. The content, or a portion thereof, is presented upon an electronic display, such as a reflective display, an emissive display, or other form of electronic display. In some implementations the reflective display comprises an electrophoretic display (EPD).

The optical assembly is configured with one or more optical components including an image projector, an imager (such as a camera, photodetector, and so forth), a reading light, and so forth. In some implementations, components of the optical assembly are distributed throughout the eBook reader device, one or more accessories, or a combination thereof. Furthermore, the optical components may provide multiple functions. For example, in some implementations the image projector may also function as a reading light to illuminate the display, such as the EPD.

The image projector is configured to generate an image. The image projector may comprise a liquid crystal display projector, a liquid crystal on silicon (LCOS) projector, a laser projector, a laser scanning projector, a digital micromirror device, and so forth. In some implementations the image projector is configured to generate full color, full motion video. The electronic display and the image projector may be used to cooperatively render content. For example, in the eBook reader device the EPD renders text of a magazine article while the projector renders a color video relating to the text. In some implementations the image projector may be configurable to allow projection of an image upon a portion of the EPD.

The imager may comprise a camera or other device configured to generate image data of a scene. The imager may incorporate a single or multi-element array of photodetectors such as a charge coupled device (CCD), a complementary metal-oxide (CMOS) sensor, photodiodes, and so forth. In some implementations the image projector, the imager, the reading light, and so forth may share one or more components in the optical assembly. For example, the digital micromirror device may direct light from a projector source to the target, and also to direct light from a source to one or more imagers. An image is thus acquired by scanning across a desired field of view.

Information gathered by the imager determines, at least in part, a user input. This user input may include gestures, at least partial obscuration or distortion of a command image, or a combination thereof. For example, a command image may include an icon to pause video being rendered by the projector. When the user places an object such as a finger over a command image, rendered on the electronic display (with or without physically touching the display) the imager determines the obscuration. Alternatively, when the command image is rendered by the projector, the imager determines the distortion to detect the user input. Such a determination may then be used to initiate a command previously associated with the command image.

To continue the example, assume that the projector projects the command image. The user then places a finger over at least a part of the command image. This placement distorts the command image, which is now projected at least partially onto the back of the user's finger. The imager senses the distortion, which in turn is used to determine that the user has selected the command image. Thus, the command to pause the projected video is activated, and a component coupled to the projector pauses the video.

The imager may also recognize symbols or codes presented on the electronic display, the device, or other items external to the device. For example, a piece of paper containing a code indicating a particular piece of content may be in the field of view of the imager. The device may then recognize the code, and provide content on the electronic display or via the projector, or both, which is associated with the code.

Furthermore, a calibration module may use the imager to calibrate the projected image. The projector may render a test or calibration pattern detected by the imager. Distortions of the calibration pattern introduced by characteristics such as coloring or topology of the surface are detected, and the projector adjusts the projected image in response to more closely render an intended image. For example, suppose the user configures the projector to display at an angle onto a light yellow wall. Without adjustment, the image would appear to suffer the "keystone effect" wherein the image takes on a trapezoidal appearance as well as some distortion in the presented color due to the background. However, with calibration and adjustment the image is correctly presented as a rectangle with the color adjusted to more accurately represent the intended image.

The calibration pattern and corresponding adjustment of the projected image may be interleaved with image projection, to provide for dynamic readjustment of the projected image to account for a changing projection surface. Thus, when the user moves the projector, when the projection surface itself moves, or a combination of both, the projected image is corrected to project the desired image.

The reading light is configured to illuminate the electronic display of the eBook reader device, and particularly, to enable viewing of the display in low-light conditions. In the implementations described herein, the reading light may be embedded with the optical assembly. The reading light may comprise a light emitting diode (LED), laser, incandescent, fluorescent, electroluminescent, or other source configured to generate photons in wavelengths visible to the human eye.

While specific components and placements are described herein, it is noted that potentially other types of optical components, placements, and so forth may be utilized to enable the rendering of images and acquisition of user input. Accordingly, the discussion of specific implementations of the optical assembly in this disclosure may equally apply to other implementations that may be used in conjunction with electronic devices, such as the example eBook reader device illustrated herein, as well as netbooks, cellular phones, and so forth.

Illustrative eBook Reader Device And Cover

Figure 1:
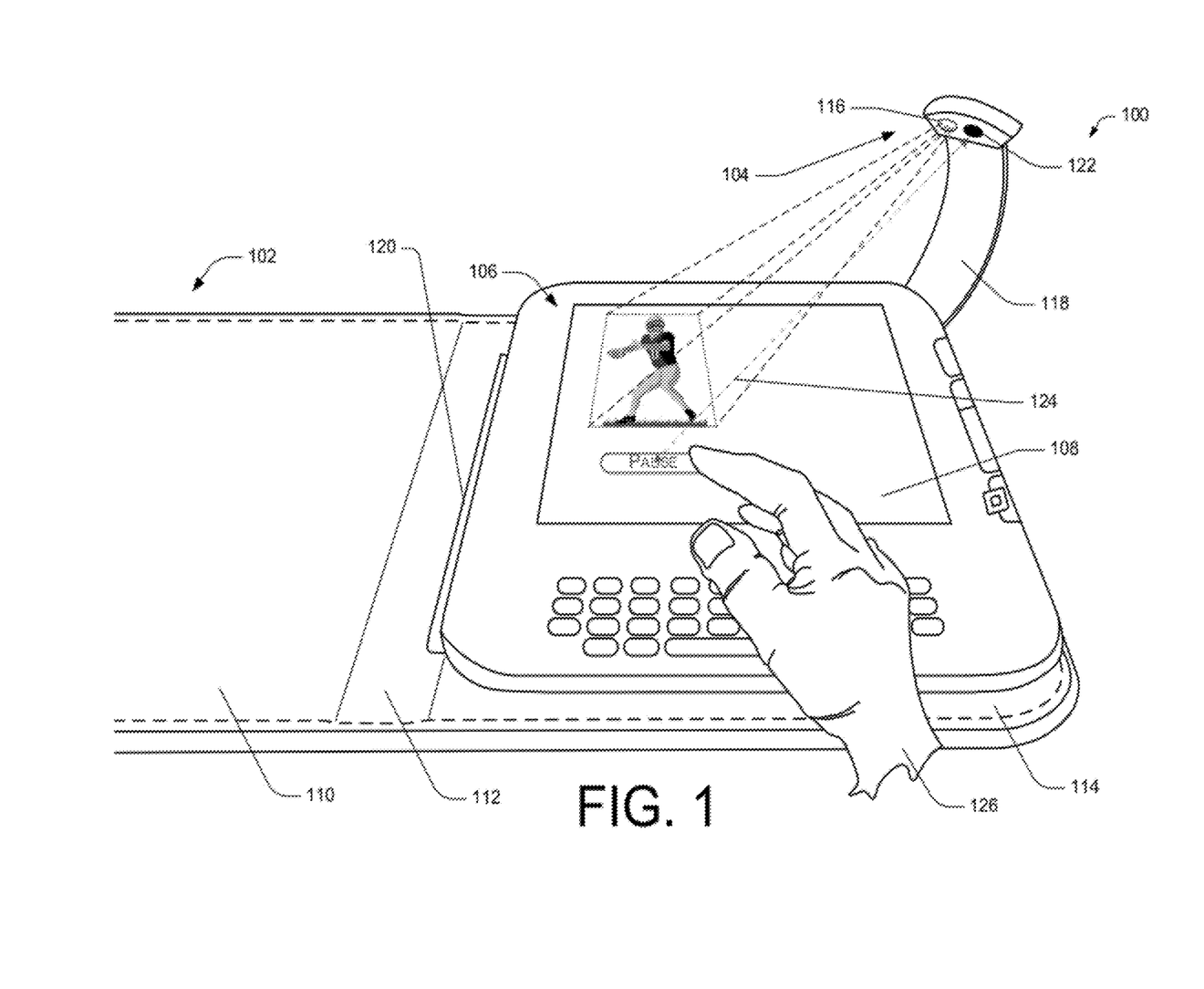
FIG. 1 shows a perspective view of a dedicated handheld electronic book ("eBook") reader device and a cover for the eBook reader device that includes an optical assembly including a projector and an imager.

1. FIG. 1 illustrates a perspective view 100 in which a cover 102 incorporating an optical assembly 104 is coupled to an eBook reader device 106. The optical assembly 104 enables functions including projecting an image, acquiring an image, illuminating an electronic display 108 of the device 106 in low-light conditions, and so forth. The optical assembly 104 as a whole, or individual components therein, may be moveable such that their field of projection, view, illumination, and so forth are adjustable. In some implementations, the individual components within the optical assembly 104 are independently directable, thus allowing the projector to project in one direction while the imager is directed in another direction. The optical assembly may comprise one or more lenses configured to direct light from the projector, to the imager, or both. At least a portion of the one or more lenses or other optical components such as mirrors, prisms, and so forth, may be shared in some implementations.

The cover 102 includes a front cover panel 110, a spine 112, and a back cover panel 114. The optical assembly 104 may include a projector 116, an imager 122, a reading light (not shown), and so forth.

The projector 116 is configured to project an image onto a surface. For example, the projector 116 may comprise a pico projector using lasers to generate a color image. As shown here, the projector 116 is projecting an image onto the electronic display 108 surface. This may be useful where the attributes of the electronic display 108 and the projector 116 provide for different capabilities. For example, the electronic display 108 may be configured to provide for presentation of black and white images and text, while the projector 116 may be configured to provide full-motion color video. Directing content to a suitable device for rendering improves the user experience. Thus, the user reading a sports magazine article sees text rendered on the electronic display 108 and a video of a featured play by an athlete presented via the projector 116 in this example.

The imager 122 may be configured to image a designated field of view. The imager 122 may detect obscurations or distortions 124 of the image introduced by the user 126, such as a finger, hand, or other instrument moved in the field of view. Once determined, a pre-determined command may be initiated, as discussed in more detail below with reference to FIG. 6.

A flexible connector 118 joins the optical assembly 104 to the cover 102. In some implementations, a rigid or semi-rigid articulated arm may join the optical assembly 104 to the cover 102 or the device 106.

The cover 102 may be physically affixed to the device 106 by a connection mechanism 120. The connection mechanism 120 may include such things as an adhesive, a hook-and-loop fastener, elastic straps, magnetism, clips, hooks, etc. The connection mechanism 120 is shown in this illustration on the spine 112. In other implementations, the connection mechanism 120 may be located, for example, on an inside surface of the back cover panel 114 or other places on the cover 102. In some implementations, the cover 102 may be formed as a sleeve into which the device 102 is placed. In such implementations, the cover 104 may lack a discrete connection mechanism 120 because the cover 102 itself functions as the connection mechanism 120 by surrounding the device 102.

The connection mechanism 120 may further facilitate an electrical connection as well as a physical connection. For example, the connection mechanism 120 may create a physical-electrical connection that carries electrical current for powering the optical assembly 104, data between components within the optical assembly 104 and the device 106, as well as physically connecting the cover 102 to the device 106.

In one implementation, the connection mechanism 120 may not supply power to the optical assembly 104. In this implementation, a battery embedded in the cover 102 or an external power source such as an external battery or power cord may provide power for the optical assembly 104. In some implementations, the optical assembly 104 may transfer data wirelessly. This wireless data transfer may comprise a personal area network, such as Bluetooth.

Although the illustrative examples provided herein described the optical assembly 104 as part of a cover 102 for the device 106, the optical assembly 104 described in this disclosure may be attached directly to the device 106, or be embedded directly into a housing of the device 106. In these implementations, the optical assembly 104 is present even when the cover 102 is not coupled to the device 106.

Figure 2:
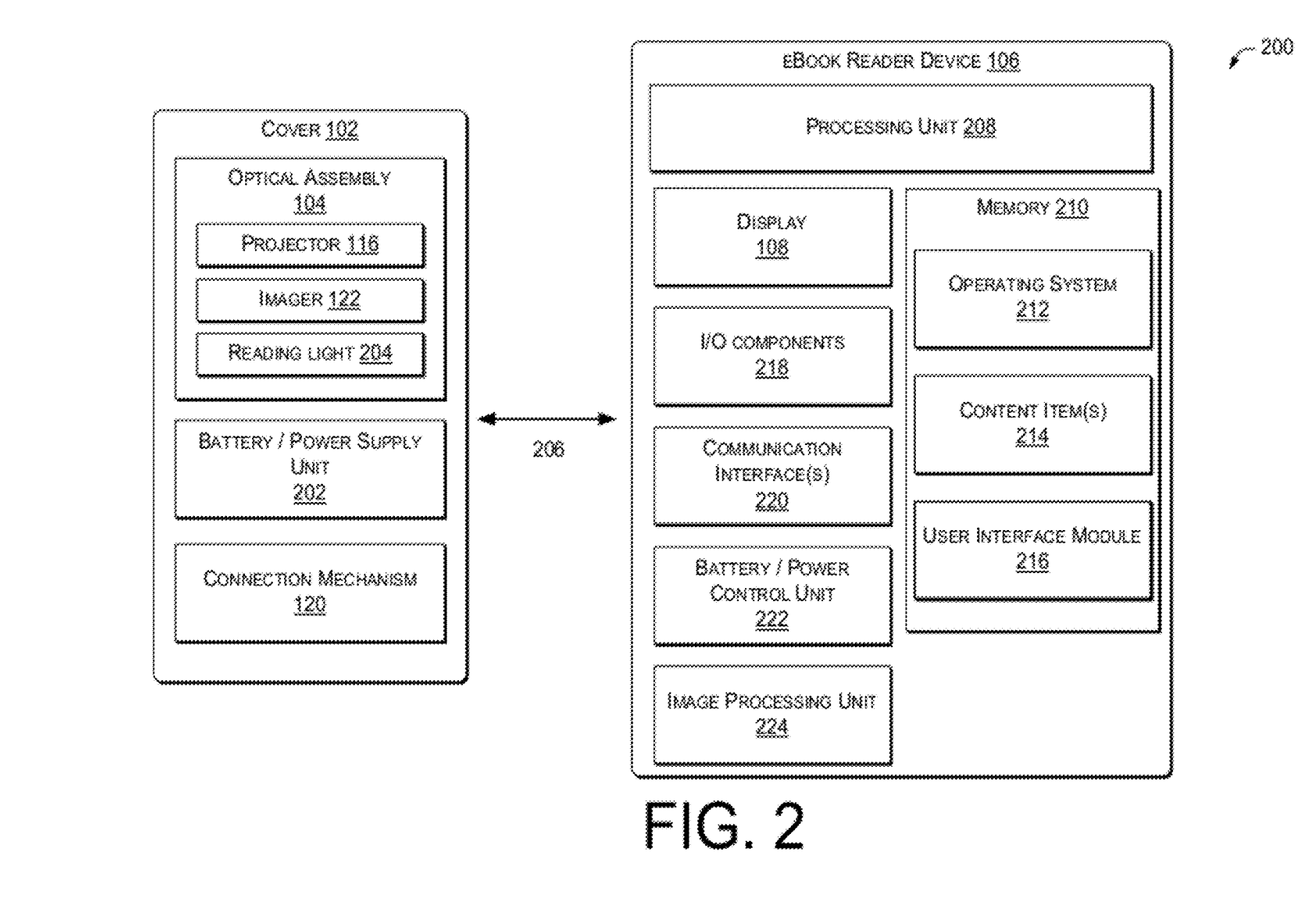
FIG. 2 is a block diagram showing components that may be implemented in subsystems of the cover and subsystems of the eBook reader device of FIG. 1.

FIG. 2 illustrates example components 200 that might be implemented in the cover 102, the optical assembly 104, and the device 106. Functional components that might be implemented in the cover 102 include the optical assembly 104, the connection mechanism 120, and a battery/power supply unit 202. The optical assembly 104 may comprise the projector 116, the imager 122, a reading light 204 to direct illumination from the light source 116 over the display 108, and so forth.

The battery/power supply unit 202 may provide electrical power from a battery or from any external source such as a power cord.

The connection mechanism 120 creates a coupling 206 between the cover 102 and the device 106. As discussed above, this coupling 206 may be a physical-electrical coupling between the cover 102 and the device 106. In some implementations, the coupling 206 may provide an optical connection between the cover 102 and the device 106 for carrying light for illumination, projection, or data transfer. In this manner, power from the device 106 may be supplied to the optical assembly 104 through the coupling 206, making the battery/power supply unit 202 optional. Alternatively, the coupling 206 may simply be a physical or mechanical coupling. In some implementations, the physical coupling and the electrical coupling may be performed by separate mechanisms (e.g., hooks provide a physical coupling and exposed electrical connectors which mate when the cover 102 is coupled to the device 106 forming an electrical coupling).

The device 106 may be equipped with the electronic display 108. In one implementation, an electrophoretic display (EPD), also known as "ePaper" is used. In some implementations, the EPD is bi-stable, meaning that it is capable of holding text or other rendered images even when very little or no power is supplied to the display. The electronic display 108 may be reflective, such that images are rendered using an ambient light source external to the display. Such displays include electrophoretic displays (EPDs), bi-stable liquid crystal displays (LCDs), digital micromirror devices (DMDs), cholesteric, pigmented electrophoretic, interferometric, and others. Emissive displays which generate their own light for display may also be used. For example, the display 108 may comprise a backlit LCD, organic light emitting diode (OLED) display, and so forth.

In some implementations, the device 106 may include a second display. Among these implementations, the second display may be positioned adjacent to the reflective display. The second display may be embodied using a different display technology, with a different (e.g., faster) refresh rate. For instance, the first display may comprise an EPD, while the second display utilizes an OLED. The second display may be configured to enable color presentations and graphical user interfaces. Further, any one of the displays may include touch technology to enable a touch screen user interface so that users may enter commands through touch or non-contact gestures.

The electronic display 108 may display electronic documents, such as electronic books or "eBooks." The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or eBook may include any visual content that is in electronic or digital form.

In a very basic configuration, the device 106 includes a processing unit 208 composed one of one or more processors, and a memory 210. The memory 210 is an example of computer storage media and may include volatile and nonvolatile memory. Thus, the memory 210 may include, but is not limited to, RAM, ROM, EEPROM, flash memory, or other memory technology, or any other medium which can be used to store media items or applications and data which can be accessed by the device 106.

The memory 210 may be used to store any number of functional components that are executable on the processing unit 208, as well as data that are rendered by the device 106. For example, the memory 210 may store an operating system 212 and one or more content items 214, such as eBooks.

The term "page," as used herein, refers to a collection of content that is presented at one time in the display 108 of the eBook reader device 102. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

A user interface module 216 may also be provided in memory 210 and executed on the processing unit 208 to facilitate user operation of the device 106. The user interface module 216 may provide menus and other navigational tools to facilitate selection and rendering of the content items 214. The user interface module 216 may further include a browser or other application that facilitates access to sites over a network, such as websites or online merchants.

The device 106 may further be equipped with various input/output (I/O) components 218. Such components may include various user interface controls (e.g., buttons, joystick, keyboard, etc.), audio speaker, connection ports, and so forth. One or more communication interfaces 220 may also be provided to facilitate communication with external, remote computing sources over various networks, such a network or with other than a local device. Content (e.g., eBooks, magazines, audio books, etc.), as well as program modules, may be transferred to the device 106 via the communication interfaces(s) 220. The communication interface(s) 220 may support both wired and wireless connection to various networks, such as cellular networks, radio, WiFi networks, short range networks (e.g., Bluetooth), IR, and so forth. For example, the device 106 may be equipped with an antenna that may function as a radio frequency transceiver to facilitate wireless communication over a wireless network.

The device 106 may also include a battery/power control unit 222. The battery/power control unit operatively controls an amount of power, or electrical energy, consumed by the device 106. Actively controlling the amount of power consumed by the device 106 may achieve more efficient use of electrical energy stored by the battery 222. In some implementations, power from the battery/power control unit 222 is provided to accessories that are attached to the device, such as the cover 102, which in turn supplies power to the optical assembly 104. The power control unit 222 may further include a clock/timer for accurate control of power consumed by the device 106.

Figure 9:
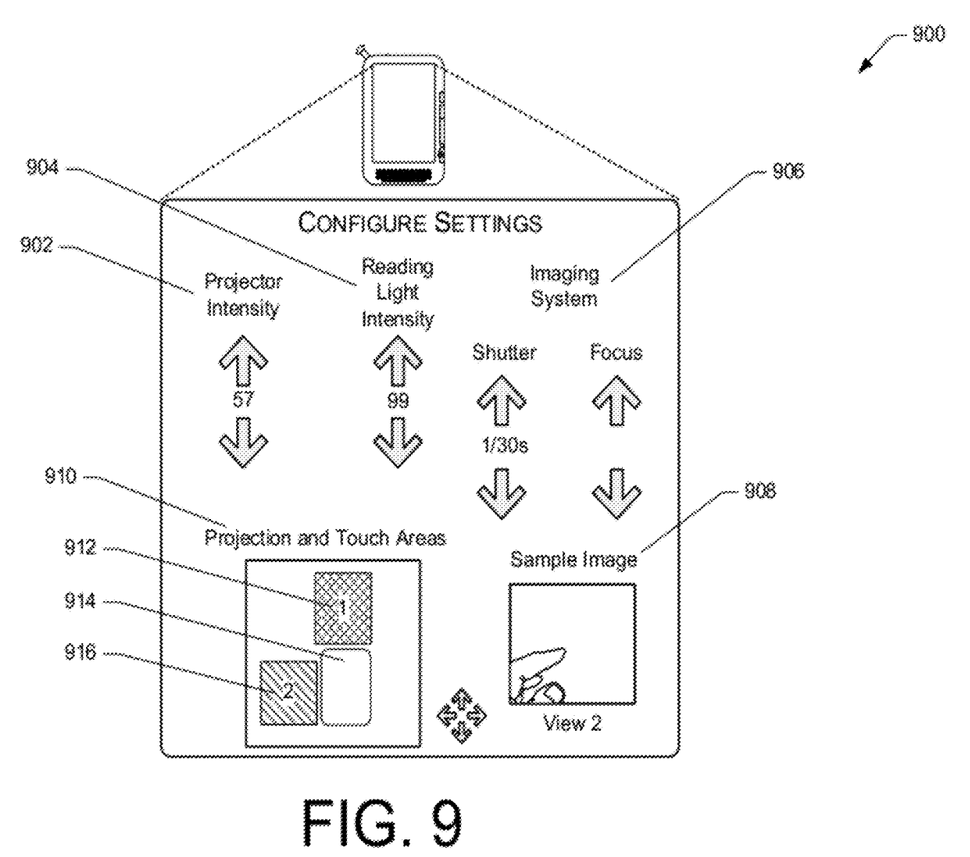
FIG. 9 shows a user interface on the eBook reader device allowing configuration of the optical assembly components.

FIG. 2 also illustrates that the device may include an image processing unit 224. The image processing unit 224 accepts data from the operating system 212 for display and configures the data for rendering upon the display 108 or via the projector 116. In some implementations a plurality of image processing units 224 may be present. The image processing unit 224, the processing unit 208, or both may determine whether to render content on the display 108 or via the projector 116. FIG. 9 below discusses this determination in greater depth.

The eBook reader device 106 may have additional features or functionality. For example, the eBook reader device 106 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Illustrative Optical Assembly

Figure 3:
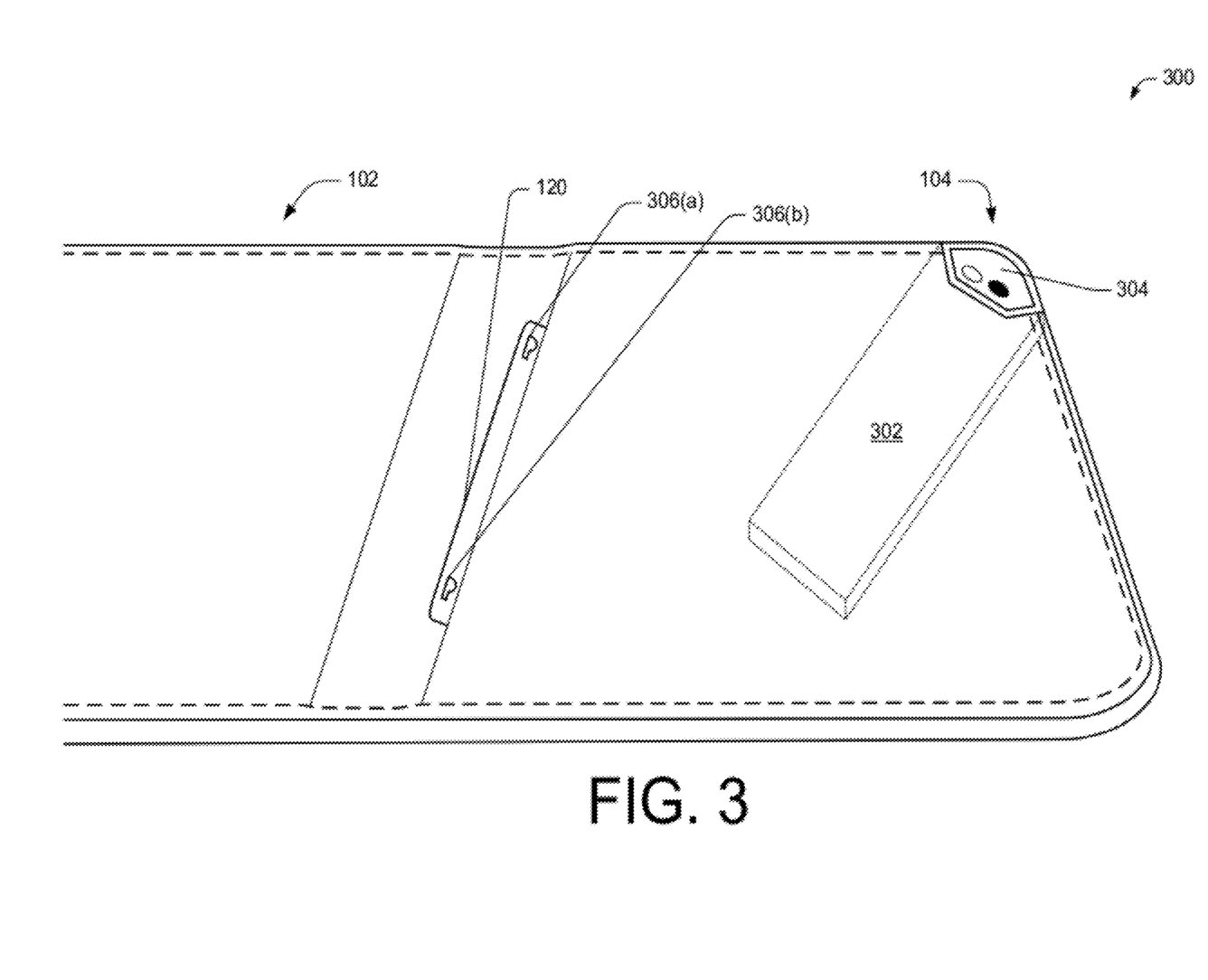
FIG. 3 shows a perspective view of the cover with the optical assembly fully inserted into the cover.

FIG. 3 illustrates a perspective view 300 of the cover 102 with the optical assembly 104 fully inserted into the cover 102. In this illustration, the device 106 is omitted to better illustrate the features of the retractable optical assembly 104. In one implementation, the optical assembly 104 is sufficiently thin to be concealed within the cover 102 when not in use.

The optical assembly 104 may occupy a sleeve, a pocket, or the like 302 within the cover 102. When fully inserted into the cover 102, an end of the optical assembly 104 may remain exposed. The end of the optical assembly 104 may have a gripping surface 304 for a user to grasp in order to withdraw the optical assembly 104 from the cover 102. For example, the user may grab the exposed, gripping surface 304 with a thumb and index finger, and then pull the optical assembly 104 out from the cover 102. In some implementations, the end of the optical assembly 104 forms a seal with the cover 102 when the optical assembly 104 is fully inserted into the cover 102. This seal can prevent contaminants from entering the cover 102 when the optical assembly 104 is not in use.

In one implementation, the optical assembly 104 may be completely concealed within the cover 102 when not in use. When completely concealed within the cover 102 the optical assembly 104 would not have an exposed, gripping surface 304. Movement of the optical assembly 104 into and out of the cover 102 may be actuated by a slider mechanism (not shown), for example, a slider exposed on an outside surface of the cover 102. In other implementations, the optical assembly 104 may be automatically extended or retracted, such as with a motor, actuator, and so forth.

The perspective view 300 also shows one implementation of the connection mechanism 120. In this implementation, the connection mechanism 120 may be one or more hooks 306. For example, two hooks 306(a) and 306(b) may be used to couple the cover 102 to the device 106. Each hook 306(a), 306(b) may be electrically conductive, with one of the two hooks 306(a) carrying a positive current while the other hook 306(b) carries a negative current. Alternatively, a single electrically-conductive hook 306, providing a single current path, may contain a plurality of conductors insulated from one another. For example, a top conductive layer may be separated from a bottom conductive layer by an insulator, forming two conductive pathways. Alternately, a non-conductive hook 306, or a hook 306 coated with an insulator, may have a plurality of conductive traces on a surface of the hook 306.

As discussed above, power supplied to the cover 102 by the hooks 306, or other connection mechanism 120, may be provided to the optical assembly 104 by wiring or other electronics (not shown) within the cover 102.

Figure 4:
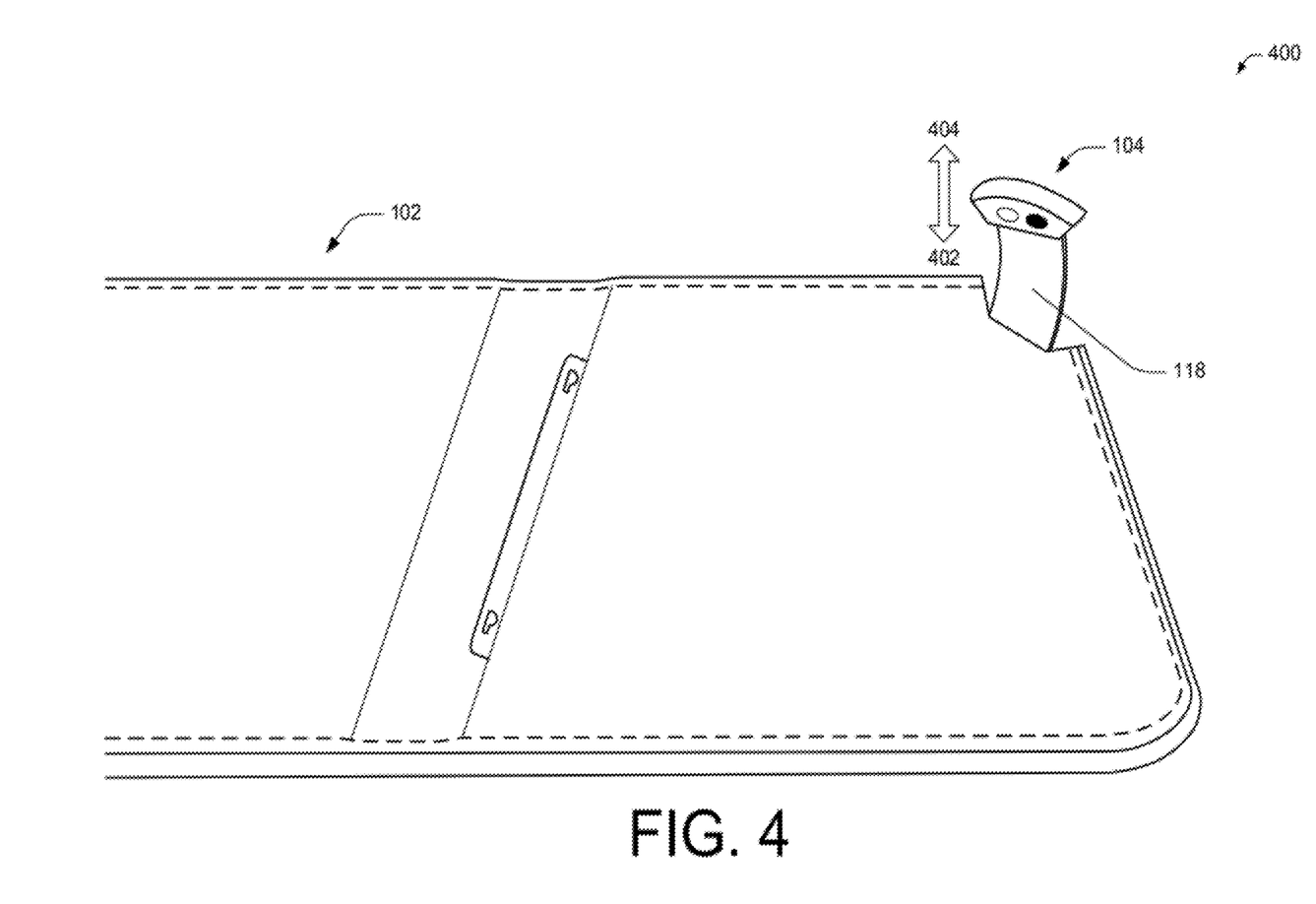
FIG. 4 shows a perspective view of the cover with the optical assembly partially withdrawn from the cover.

FIG. 4 is shows a perspective view 400 of the optical assembly 104 partially withdrawn from the cover 102. In some implementations, a strength of illumination of the projector 116, the reading light 204, or both may change depending on a distance that the optical assembly 104 is withdrawn from the cover 102. For example, when the optical assembly 104 is fully inserted into the cover 102, as shown in FIG. 3, the optical assembly 104 may be automatically turned off. When the optical assembly 104 is halfway withdrawn from the cover as shown in FIG. 4, the projector 116 may provide illumination that is about half of a maximum illumination.

Figure 5:
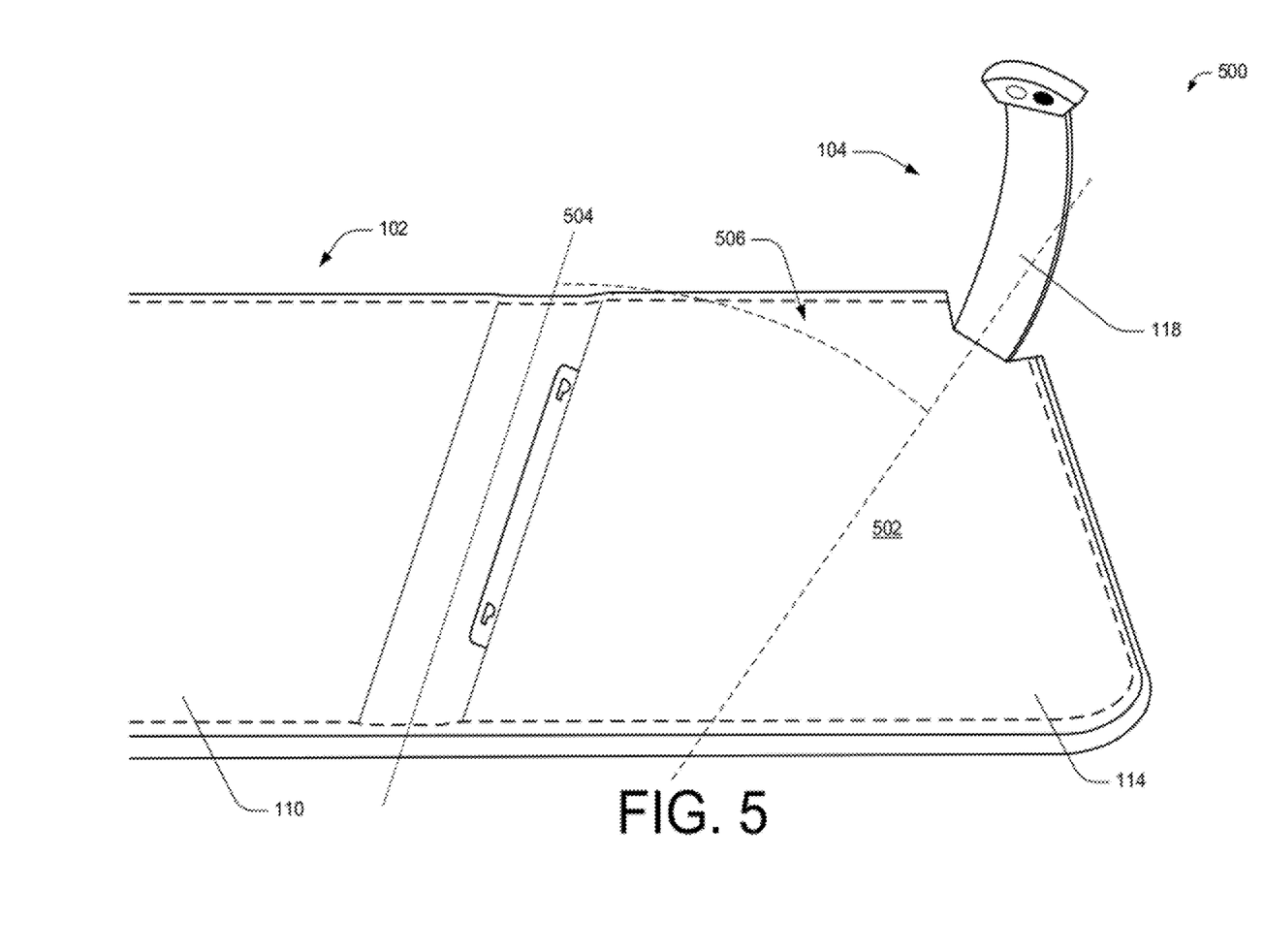
FIG. 5 shows a perspective view of the cover with the optical assembly fully withdrawn from the cover.

When the optical assembly 104 is fully withdrawn from the cover 102 (as shown in FIG. 5), the strength of illumination provided by the projector 116 may be at maximum illumination. In this implementation, the projector 116 is configured to provide a greater strength of illumination in proportion to the distance that the optical assembly 104 is withdrawn from the cover 102. This mechanism for adjusting the illumination strength of the projector 116 enables the user to dim the projector 116 simply by slightly inserting 402 the optical assembly 104 into the cover 102. Conversely, if the projector 116 is not at maximum strength, the user can brighten the projector 116 by withdrawing 404 the optical assembly 104 slightly farther from the cover 102.

A mechanism in the cover 102 may detect a distance that the optical assembly 104 is withdrawn from the cover 102 and adjust the illumination strength of the projector 116 accordingly. In some implementations, the mechanism may be a variable resistor coupled to the flexible connector 118 or alternatively coupled to an inside surface of the sleeve 302. In other implementations, a mechanical sensor such as a rotatable wheel is moved as the optical assembly 104 is withdrawn from or inserted into the cover 102 thereby generating a signal which may be used to adjust the illumination strength of the light source 116. Alternate mechanisms for correlating a position of the optical assembly 104 to the illumination strength of the projector 116 are also envisioned.

The projector 116 may include, but is not limited to a liquid crystal display projector, a liquid crystal on silicon (LCoS) projector, a laser projector, a laser scanning projector, a digital micromirror device, and so forth. In some implementations, a light for the projector may be generated within the device 106 and optically transmitted to the optical assembly 104. The light may be transmitted through the coupling 206 as described above.

The particular projector 116 selected for a given application may be based upon considerations of size, electrical consumption, ability to generate illumination of varying intensities, and flexibility. Due to their compact size, pico projectors using lasers and digital micromirror devices may be used in some implementations.

FIG. 5 is shows a perspective view 500 of the optical assembly 104 fully withdrawn from the cover 102. When fully withdrawn from the cover 102, a geometry of the optical assembly 104 may allow the cover 102 to be closed while the optical assembly 104 is extended. The flexibility in the shape of the flexible connector 118 may create the geometry that allows the cover 102 to be closed when the optical assembly 104 is fully withdrawn from the cover.

The flexible connector 118 may be constructed from materials including, but not limited to, a high-yield strength metal, a superelastic material, a polypropylene material, and a shape-memory alloy. Shape-memory alloy includes spring steel, smart metal, memory alloy, smart alloy, alloys of copper-zinc-aluminum-nickel, alloys of copper-aluminum-nickel, alloys of nickel-titanium, and other materials having the properties generally associated with shape-memory alloys.

In some implementations, the flexible connector 118 may lie flat within the cover when retracted and automatically curl over the display 108 when slid out of the cover 102 to position the projector 116 to over the display 108 of the device 106. For example, if the flexible connector 118 is constructed from shape-memory alloy, the shape-memory alloy may automatically change from a flat shape when inserted into the cover 102 to a curved shape when withdrawn from the cover 102. While the flexible connector 118 is illustrated herein as a flat strip of material, the flexible connector 118 may also take other forms such as a wire or tube.

In one implementation, the flexible connector 118 may also supply power and data connectivity to the optical assembly 104. For example, if the flexible connector 118 is constructed from an electrically-conductive alloy or metal, the flexible connector 118 itself can carry power or signals or both to the projector 116. In some implementations, power, signals, or both may be supplied to the optical assembly 104 by mechanisms including, but not limited to, a separate wire running from the cover 102 to the optical assembly 104, electrically conductive traces along the surface of the flexible connector 118, wires inside a hollow chamber (e.g., in a tube) of the flexible connector 118, and the like.

FIGS. 1 and 3-5 show an illustrative example in which the optical assembly 104 is located in a top, outside corner of the back cover panel 114. In other implementations, that optical assembly 104 may be situated differently, for example the optical assembly 104 may be located on other corners of the cover 104, along an edge of the cover 104, or along the spine 112. The optical assembly 104 may be situated in the cover 102 such that when the cover 102 is coupled to the device 106, the optical assembly 104 does not block or interfere with the antenna of the device 106.

In the illustrative example shown in FIGS. 1 and 3-5, an axis 502 along which the optical assembly 104 moves when withdrawn from or inserted into the cover 102 is not parallel to an axis 504 defined by the spine 112. The angle 506 formed by the reading-light axis 502 and the spine axis 504 is approximately 45° in the illustrative examples. More generally, the angle 506 may be between approximately 22° and 68°.

Although the optical assembly 104 is described herein as adapted for coupling to, or being integral with, an eBook reader device 106, the optical assembly 104 may also be adapted for coupling to other electronic devices such as portable media players, laptop computers, netbooks, and so forth.

Figure 6:
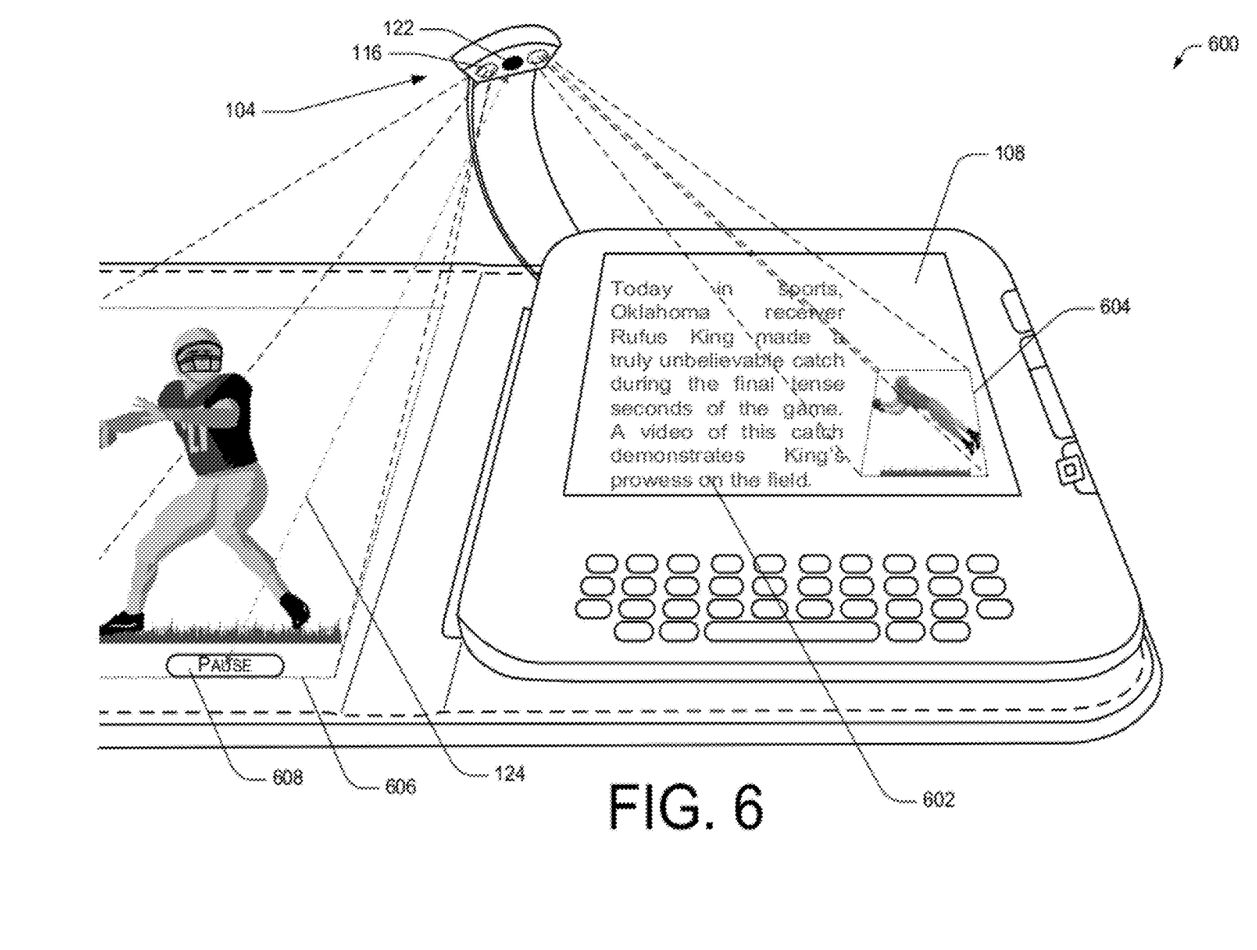
FIG. 6 shows a perspective view of the eBook reader device and a cover that includes an optical assembly including a projector and an imager configured to allow projection upon and imaging of the eBook reader device display and a portion of the cover.

FIG. 6 shows a perspective view 600 of the eBook reader device 106 and the cover 102 that includes the optical assembly 104. In this implementation, the optical assembly 104 comprises two of the projectors 116 and the imager 122. The electronic display 108 presents black and white text 602 in this example, although the electronic display may display color text in other examples. The optical assembly 104 projects a first image 604 onto the electronic display 108 as well as a second image 606 on the inside of the front cover panel 110. For example, the first image 604 may be a color still image of a football player. The second image 606 may be full motion video of one of the football plays discussed within the text 602.

Within the second image 606 a command image 608 is rendered. The command image 608 is a word, icon, or other feature or area associated with a pre-determined command or action. In some implementations, a pre-determined area within an image may be associated with a command. For example, the right margin may correspond to a "next page" command, even when no icon is projected.

Upon selection of the command image 608, the pre-determined command or action may be initiated. For example, as shown here, the command image 608 is a rounded rectangle with the word "pause" inside. This command image 608 may thus correspond to the action of pausing the video that the projector currently plays back.

Other actions may include altering the presentation of images presented upon the electronic display, projected by the projector, or both. Actions may include displaying a different page, resuming playback of the video; changing the size of the presentation, and so forth.

The device 106 may determine the user's selection of the command image 608 in several ways. For example, the command image 608 may be projected over a touch sensitive surface. Pressure applied in the area designated by the command image may thus be interpreted as a selection.

The imager 122 may also be used to determine a user's selection of the command image 608. The imager 122 may detect the obscurations or distortions 124 of the image introduced by the user 126, such as a finger or hand moved in the field of view of the imager 122. For example, as shown here the projector 116 is generating the command image 608 while the imager 122 is also imaging the command image 608. Upon insertion of an intervening object, such as a finger or hand, this path is disrupted or distorted 124. This disruption or distortion 124 is then interpreted to indicate a selection of the corresponding command image 608.

In another implementation, the electronic display 108 may generate the command image 608. In such an implementation, the imager 122 similarly images the electronic display 108 looking for the obscurations or the distortions 124 indicating a selection.

The imager 122 may also accept gestural input. For example, the act of a user waving a hand through the field of view of the imager 122 may correspond to the command turning the page.

Figure 7:
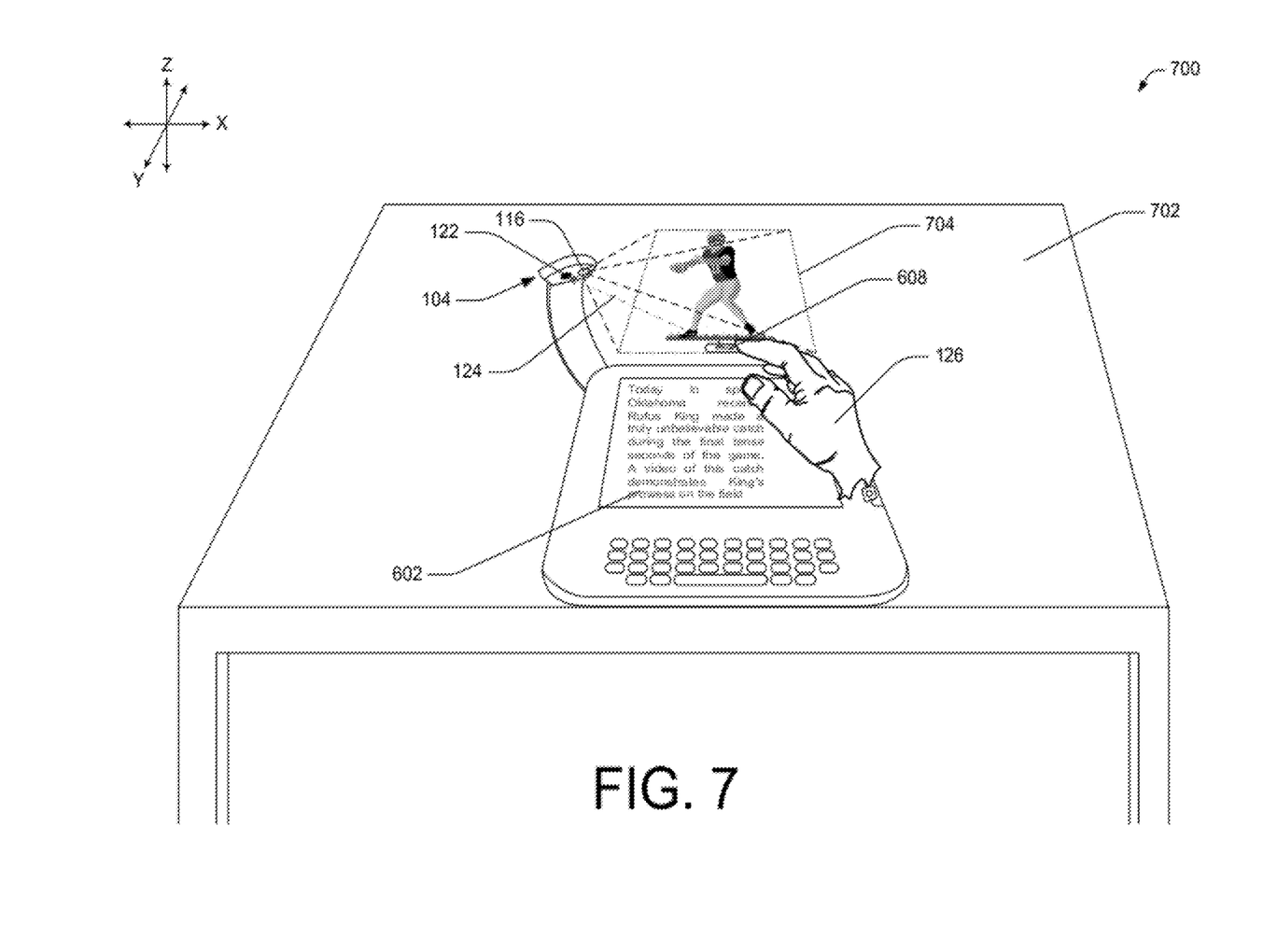
FIG. 7 shows a perspective view of the eBook reader device that includes an optical assembly including a projector and an imager configured to allow projection of an image including a command image upon a surface, such as a desktop.

FIG. 7 shows a perspective view 700 of the eBook reader device 106 that includes the optical assembly 104 comprising the projector 116 and the imager 122. As described above, the optical assembly 104 may be directed to operate in a direction more convenient or desirable to the user.

As shown here, the user has placed the device 106 upon a tabletop 702. The integrated optical assembly 104 is deployed. The projector 116 within the optical assembly 104 projects an image 704 upon the tabletop 702. As described above, a command image 608 is also projected onto the tabletop 702. The user 126 places his finger over the command image 608, obscuring it. The imager 122 detects this obscuration 124, and a resulting command to pause the video presented in the image 704 is activated. Thus, the user is able to extend content beyond the physical confines of the device 106, while retaining the ability to interact with that content.

Figure 8:
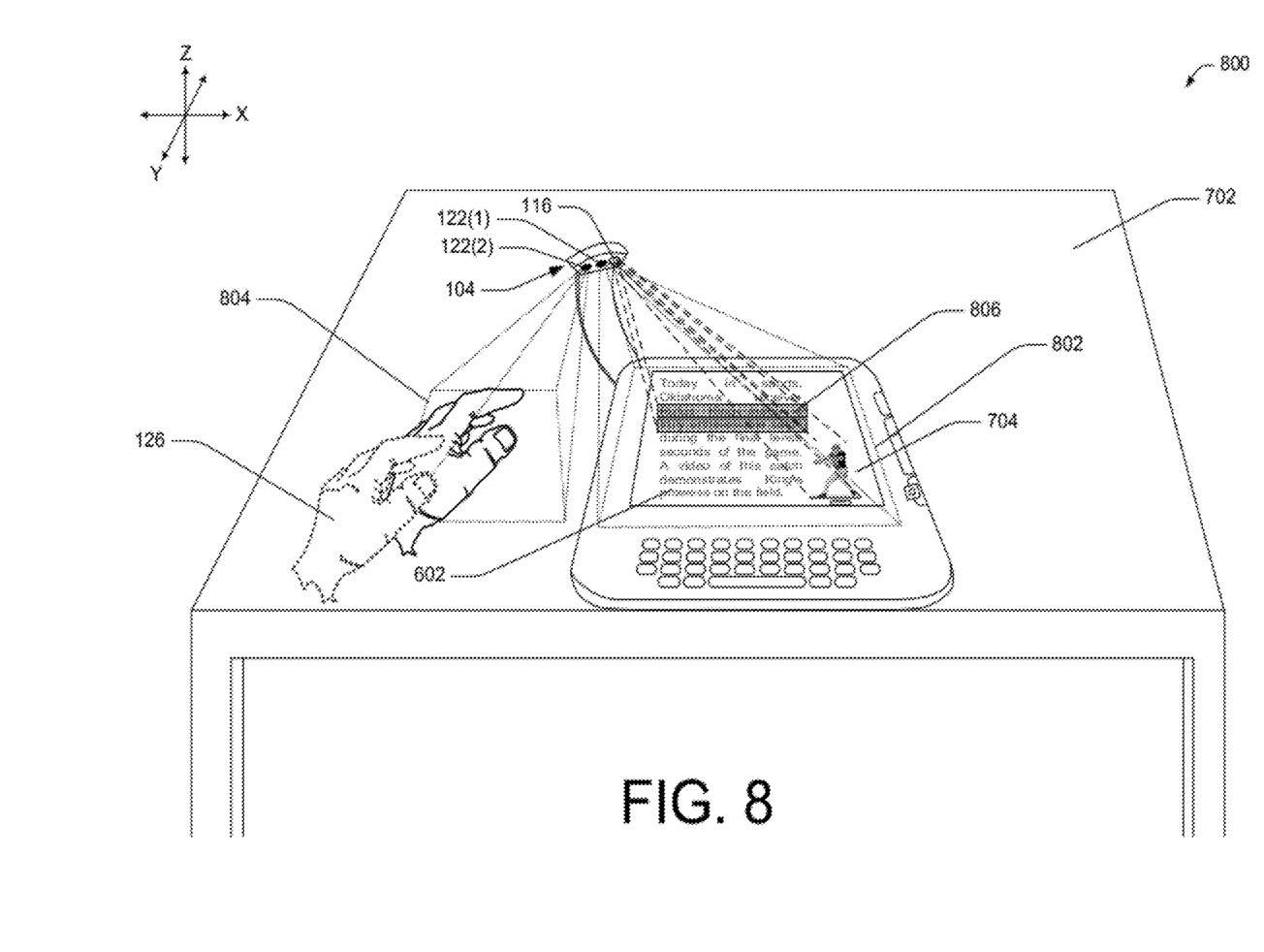
FIG. 8 shows a perspective view of an alternative of the eBook reader device with the projector and an imager configured accept a user input from a field of view.

FIG. 8 shows a perspective view 800 of the eBook reader device in an alternative configuration. While this alternative configuration depicts a projector and an imager, in some implementations the optical assembly may include only one or the other, possibly in combination with other components such as the reading light.

In this configuration, the optical assembly 104 comprises the projector 116 and two imagers 122(1) and 122(2). The imagers 122(1)-(2) accept user input from within a field of view. As illustrated here, the imager 122(1) may be configured to image a field of view 802 encompassing at least a portion of the electronic display 108. The imager 122(2) is configured to image a field of view 804 generally to the left of the device 106 (or in any other direction in other implementations). The device 106 determines gestures or other image-based input performed within the field of view 802 or the field of view 804. These determined gestures may, in turn, initiate one or more pre-determined actions.

The image-based input may comprise an absolute position of an object within a field of view of the imager. Objects may include all or part of the user, styli, tokens, and so forth. For example, presence of a stylus in a lower right corner of the field of view may indicate a user input, such as may be associated with a command to present a next page.

The image-based input may also comprise a presence of an object in the field of view. For example the presence of a hand in anywhere in the field of view may indicate a user input, such as may be associated with a command to pause playback of video.

One or more motions of an object within the field of view of the imager may also comprise input. For example, the user moving their hand 126 from lower left to upper right may initiate the action of changing the presentation to the next chapter.

One or more marks presented upon a surface may be imaged and determined to be input. For example, the device 106 may image and determine input from writing on a piece of paper, white board, image on another electronic display, and so forth.

Once a gesture has been determined within the image data, a command associated with the gesture may be activated. This command may alter functions of the device, presentation of content, and so forth.

The imager, or a pair of imagers such as 122(1) and 122(2), may be configured to determine distance of the object from the optical assembly 104. For example, the pair of imagers may provide stereoscopic imaging of the field of view 802, the field of view 804, or both. This stereoscopic imaging allows for determination of the distance between the optical assembly 104 and the object, such as the user hand 126, within a volume of the field of view. Thus, gestures may include three-dimensional data. In other implementations, other techniques to determine distance may be used.

Also shown in this example is the projector 116 projecting an image onto the electronic display 108. Projection via the projector 116 and presentation via the electronic display 108 may be independent of one another, or coordinated.

In some instances, images may be projected onto at least a portion of the electronic display 108 which is configured to be free of content other than that projected by the projector 116. For example, as shown here an area on the electronic display 108 is free of content and provides an unmarked backdrop for the projected image 704.

In some implementations the projected image 704 may be combined with an image presented by the electronic display 108. For example, as shown here, the text 602 is shown with colored highlights 806 projected over the text 602. Thus, the user sees black text on a white or gray background having yellow rectangles to indicate the highlighted text.

FIG. 9 shows a user interface 900 on the eBook reader device allowing configuration of the optical assembly. Various operational parameters and settings of the optical assembly 104 are configurable. The user, executable instructions stored within a memory of the eBook reader device 106, or both may configure the operational parameters.

A control to vary projector intensity 902 may be presented to the user. Thus, the strength of the projector illumination may be varied. Other controls, not shown, may include adjustments of color balance, contrast, brightness, color temperature, and so forth. A control for varying reading light intensity 904 may also be shown.

Controls to adjust the imaging system 906 may be presented. For example, the user may adjust shutter speed, focus, contrast, brightness, color balance, and so forth. A sample image 908 may present the current field of view of the imager(s), as well as how the imaging system controls have affected an image in the field of view.

Controls to adjust the projection and input areas 910 may also be provided. These controls enable the user to select what functions are available in which areas. For example, as shown here the user has designated viewing area 1 shown by rectangle 912 as a projection and input area. Within this area, such as that corresponding to image 704 as described above, the image projector 116 will present content while the imager 122 monitors the area for input. In contrast, area 2 shown by rectangle 916 is configured for input only, such as area 804 described above. In this area, no content will be projected, however the imager 122, or in some implementations a second imager 122(2), will accept user input.

In some implementations, the device 106 may determine the orientation of the optical assembly 104 based on internal sensors, imaging data and so forth. In other implementations the user may manually input the current orientation of the optical assembly 104 or of subcomponents.

Illustrative Processes for Rendering Content with an Optical Assembly

Figure 10:
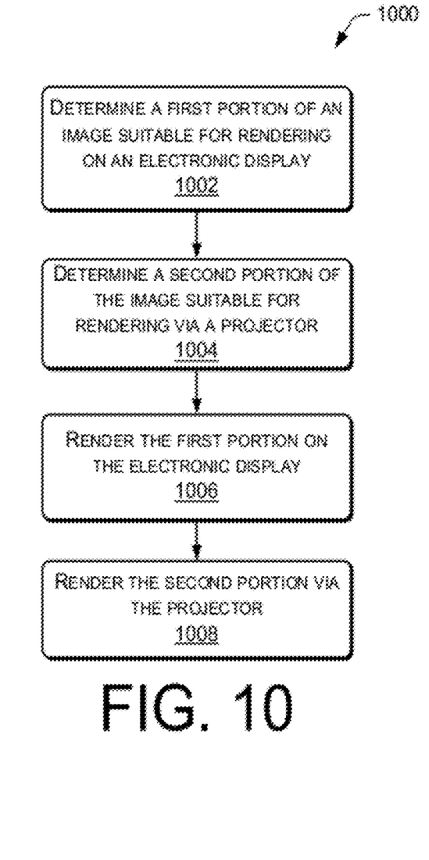
FIG. 10 is a flow diagram of a process for determining which portion of an image to render via an electronic display and which portion of the image to present via the projector.
Figure 11:
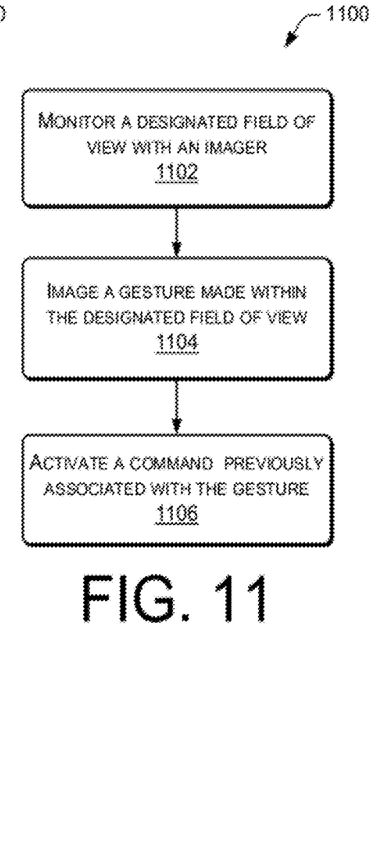
FIG. 11 is a flow diagram of a process for monitoring a designated field of view with an imager to determine a user input.
Figure 12:
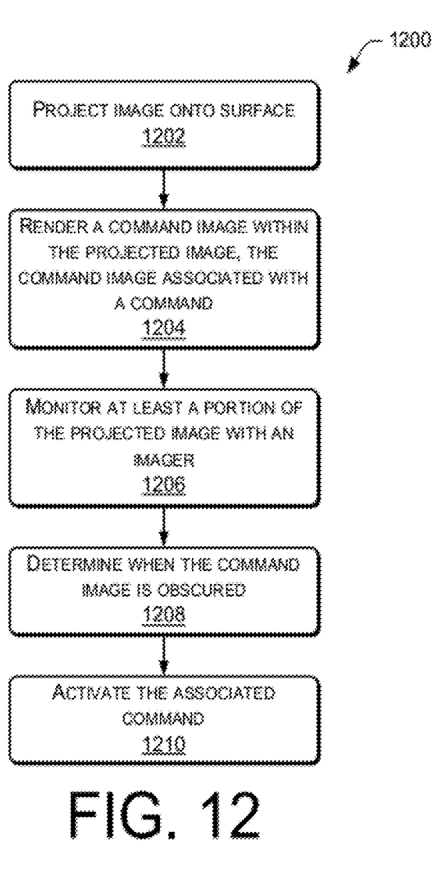
FIG. 12 is a flow diagram of a process for projecting a command image and monitoring the command image with an imager to determine a user input.

FIGS. 10-12 illustrate example processes 1000, 1100 and 1200 that may be implemented by the architecture described above with respect to FIGS. 1-9, or by other architectures. These processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other operating systems as well.

FIG. 10 is a flow diagram of a process 1000 for determining which portion of an image to render via an electronic display and which portion of the image to present via the projector.

At 1002, a first portion of an image suitable for rendering on an electronic display is determined. For example, the first portion of the image may be black and white text. The processing unit may determine that the text, being black and white is best suited for presentation on the electrophoretic electronic display.

At 1004, a second portion of the image suitable for rendering via a projector is determined. For example, the second portion of the image may be full motion color video, perhaps which relates to the text in the first portion. The processing unit may determine that the video, being color and requiring a fast refresh rate, is best suited for presentation via the projector.

The determination as to whether to display an image, or a portion of an image, upon the electronic display or via the projector may be based upon many factors. These factors include capabilities of the electronic display and projector, image characteristics such as color depth and required frame rate, user settings, availability of power, ambient light levels, and so forth. For example, when power is extremely limited, use of the projector may be discontinued to maximize operating time.

At 1006, the electronic display renders the first portion. For example, the electrophoretic display renders the black and white text. At 1008, the projector renders the second portion. As described above, in some implementations the second portion may be projected onto at least a portion of the electronic display. Thus, the first portion may be rendered such that there is an empty space, or frame, within which the projected second portion may appear.

FIG. 11 is a flow diagram of a process 1100 for monitoring a designated field of view with an imager to detect and interpret a user input. As described above, this user input may be a gesture such as a hand movement or particular hand configuration, or an obscuration or distortion of a command image.

At 1102, an imager monitors a designated field of view. This monitoring may include generating an image of a scene within the designated field of view. At 1104, a gesture made within the designated field of view is imaged. For example, the user may wave a hand through the field of view.

At 1106, a command previously associated with the gesture is activated. For example, the processing unit may execute a command to pause playback of video. In other implementations or in context with the content rendered, gestures may have different meanings. For example, the wave of the users hand through the field of view during the rendering of a still image may execute a command to change the image.

FIG. 12 is a flow diagram of a process 1200 for projecting a command image and monitoring the command image with an imager to detect and interpret a user input. At 1202, an image is projected onto a surface by a projector. At 1204, a command image within the projected image is rendered. A pre-determined command is associated with the command image.

At 1206, an imager monitors at least a portion of the projected image. At 1208, a processor determines when the command image is obscured. Once the obscuration has been determined, the associated command is activated at 1210.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An optical assembly configured to couple to an electronic device having a display, the optical assembly comprising:
   a body;
   a projector that projects an image;
   an imager that gathers image data and provides the image data to the electronic device; and
   a deployable arm that physically joins the projector and the imager to the body, wherein:
      the deployable arm retracts a housing portion of the deployable arm that encloses the projector and the imager into the body such that lenses of the projector and the imager remain exposed when the deployable arm is stowed within the body; and
      the deployable arm extends the projector and the imager away from the body when deployed from the body.

2. The optical assembly of claim 1, wherein the electronic device comprises a dedicated electronic book reader.

3. The optical assembly of claim 1, wherein the imager detects an input, and wherein the electronic device activates a command previously associated with the input at least in response to detection of the input, and alters a presentation of the projected image at least in response to the command.

4. The optical assembly of claim 1, wherein the imager detects an input, and wherein the electronic device activates a command previously associated with the input at least in response to detection of the input, and alters a presentation of an image on an electronic display of the electronic device at least in response to the command.

5. The optical assembly of claim 1, wherein the deployable arm comprises a high-yield strength metal, a superelastic material, a polypropylene material, or a shape-memory alloy.

6. The optical assembly of claim 1, wherein the projector comprises one or more light sources and a digital micromirror device.

7. The optical assembly of claim 1, wherein the imager comprises one or more charge coupled devices (CCD) or complementary metal-oxide semiconductor (CMOS) image sensors.

8. The optical assembly of claim 7, wherein the one or more lenses of the projector direct light out of the projector, and one or more lenses of the imager direct light into the imager.

9. The optical assembly of claim 1, wherein the body comprises a foldable cover for the electronic device.

10. The optical assembly of claim 1, further comprising a reading light proximate to the projector, the imager, or both.

11. The optical assembly of claim 1, wherein the body is physically and electrically coupled to the electronic device by an electrically-conductive hook.

12. The optical assembly of claim 1, wherein the projector provides intensity of illumination in proportion to a distance that the deployable arm is deployed from the body.

13. The optical assembly of claim 12, wherein operational parameters of the optical assembly are configurable.

14. A dedicated electronic book reader device comprising:
   an imager that gathers image data and provides the image data to the device;
   a processor coupled to the imager and configured by instructions stored within a memory of the device to:
      determine a gesture present within the image data; and
      activate a command previously associated with the gesture; and
   a deployable arm physically joining the imager to a body that is a portion of the device or a portion of a cover that at least partially encloses the device, the deployable arm to:
      retract the imager into the body such that one or more lenses of the imager remain exposed when the deployable arm is stowed within the body; and
      extend the imager away from the body when deployed from the body.

15. The device of claim 14, wherein the deployable arm lies approximately flat when stowed within the body.

16. The device of claim 14, wherein the gesture comprises one or more of:
   an absolute position of an object within a field of view of the imager;
   one or more motions of the object within the field of view of the imager; or
   one or more marks upon a surface within the field of view of the imager.

17. The device of claim 14, wherein the image data comprises a distance from an imaged object to the imager.

18. The device of claim 14, further comprising a projector disposed proximate to the imager that projects an image.

19. A portable electronic device comprising:
   one or more processors that determine graphical output data for rendering into at least a first image and a second image;
   one or more image processing units (IPUs) coupled to the one or more processors that generate the graphical output data;
   an electronic display coupled to the one or more IPUs that renders the first image; and an image projector coupled to the one or more IPUs that renders the second image, the first image being rendered by the electronic display independently from a rendering of the second image by the image projector.

20. The device of claim 19, wherein the image projector is to project the second image onto at least a portion of the electronic display.

21. The device of claim 19, wherein the electronic display comprises an electrophoretic display.

22. The device of claim 19, wherein the image projector couples to a body of the portable electronic device by a flexible connector comprising a high-yield strength metal, a superelastic material, a polypropylene material, or a shape-memory alloy.

23. The device of claim 19, further comprising an imager coupled to the processor and configured to accept a user input.

24. The device of claim 23, wherein the imager comprises a charge coupled device (CCD) array or a complementary metal-oxide semiconductor (CMOS) sensor array.

25. The device of claim 23, wherein the user input comprises an obscuration of at least a portion of a command image rendered upon the electronic display.

26. The device of claim 23, wherein the user input comprises an obscuration or other distortion of at least a portion of a command image rendered by the image projector.

27. The device of claim 23, wherein the imager couples to a body of the portable electronic device by a flexible connector comprising a high-yield strength metal, a superelastic material, a polypropylene material, or a shape-memory alloy.

28. The device of claim 23, wherein the image projector and the imager are disposed within a common optical assembly.

29. One or more non-transitory computer-readable storage media storing instructions that, when executed by one or more processors, cause the one or more processors to perform acts comprising:
 determining a first portion of content suitable for rendering via an electronic display and a second portion of content suitable for rendering via a projector; and
 presenting, at least in response to the determining, the first portion of content on the electronic display and the second portion of content via the projector as a projected image, the first portion being presented by the electronic display without illumination from the projector.

30. The one or more non-transitory computer-readable storage media of claim 29, wherein the presenting upon the electronic display is coordinated with the projection by the projector.

31. The one or more non-transitory computer-readable storage media of claim 29, wherein the presenting the second portion of content comprises projecting the at least a portion of the second portion of content onto at least a portion of the electronic display.

32. The one or more non-transitory computer-readable storage media of claim 31, wherein the at least a portion of the electronic display is configured to be free of content other than that projected by the projector.

33. The one or more non-transitory computer-readable storage media of claim 31, wherein at least a portion of the second portion of content is projected over at least a portion of the first portion of content.

34. The one or more non-transitory computer-readable storage media of claim 29, further comprising:
 monitoring a designated field of view with an imager;
 detecting with the imager a gesture within the designated field of view of the imager; and
 activating a command previously associated with the gesture at least in response to the detecting.

35. The one or more non-transitory computer-readable storage media of claim 34, further comprising altering a presentation of the first portion of content, the second portion of content, or both in response to the activating of the command.

36. The one or more non-transitory computer-readable storage media of claim 35, wherein the altering comprises:
 displaying a different page;
 pausing a video;
 resuming a video; or
 changing a size of the presentation.

37. The one or more non-transitory computer-readable storage media of claim 29, further comprising:
 presenting a command image associated with the second portion of content via the projector, the command image corresponding to a command;
 monitoring at least a portion of the projected image with an imager;
 detecting with the imager when the command image is obscured or distorted; and
 activating the command at least in response to the detecting.

38. The one or more non-transitory computer-readable storage media of claim 37, further comprising altering the presentation of the first portion or the second portion of content in response to the activating of the command.

* * * * *